United States Patent
Hata et al.

(10) Patent No.: US 12,326,503 B2
(45) Date of Patent: Jun. 10, 2025

(54) DISTANCE MEASURING APPARATUS

(71) Applicant: DENSO CORPORATION, Kariya (JP)

(72) Inventors: Takehiro Hata, Kariya (JP); Noriyuki Ozaki, Kariya (JP); Teiyu Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 1223 days.

(21) Appl. No.: 17/112,559

(22) Filed: Dec. 4, 2020

(65) Prior Publication Data

US 2021/0088658 A1    Mar. 25, 2021

Related U.S. Application Data

(63) Continuation of application No. PCT/JP2019/022777, filed on Jun. 7, 2019.

(30) Foreign Application Priority Data

Jun. 8, 2018 (JP) ................. 2018-110325

(51) Int. Cl.
*G01S 17/08* (2006.01)
*G01S 7/484* (2006.01)
*G01S 7/4863* (2020.01)
*G01S 7/487* (2006.01)

(52) U.S. Cl.
CPC .............. *G01S 17/08* (2013.01); *G01S 7/484* (2013.01); *G01S 7/4863* (2013.01); *G01S 7/4873* (2013.01)

(58) Field of Classification Search
None
See application file for complete search history.

(56) References Cited

U.S. PATENT DOCUMENTS

| | | |
|---|---|---|
| 2013/0242073 A1 | 9/2013 | Watanabe |
| 2018/0210069 A1 | 7/2018 | Mase et al. |
| 2019/0011567 A1 * | 1/2019 | Pacala ............ G01S 17/08 |
| 2019/0154815 A1 | 5/2019 | Oohata |

FOREIGN PATENT DOCUMENTS

| | | |
|---|---|---|
| JP | 11-094942 A | 4/1999 |
| JP | 2014077658 A * | 5/2014 |
| JP | 5644294 B2 | 11/2014 |
| JP | 2015117970 A | 6/2015 |
| JP | 2017-072504 A | 4/2017 |
| JP | 2017-083243 A | 5/2017 |
| JP | 2018-059839 A | 4/2018 |

* cited by examiner

*Primary Examiner* — Isam A Alsomiri
*Assistant Examiner* — Sanjida Naser
(74) *Attorney, Agent, or Firm* — Maschoff Brennan

(57) ABSTRACT

A distance measuring apparatus is provided which includes an illuminator, a plurality of photodetectors which detect reflected light arising from reflection of light, as emitted from the illuminator, from an object using SPADs, a time measuring unit which measures time elapsed after the emission of light from the illuminator until a number of the photodetectors which is larger than a given value have detected light, a timing controller which instructs the illuminator to emit the light, activates the SPADs in a Geiger mode, and instructs the time measuring unit to execute the time measurement, and a timing instruction unit which determines a light emission timing and an activation start timing of each of the SPADs for the timing controller.

5 Claims, 12 Drawing Sheets

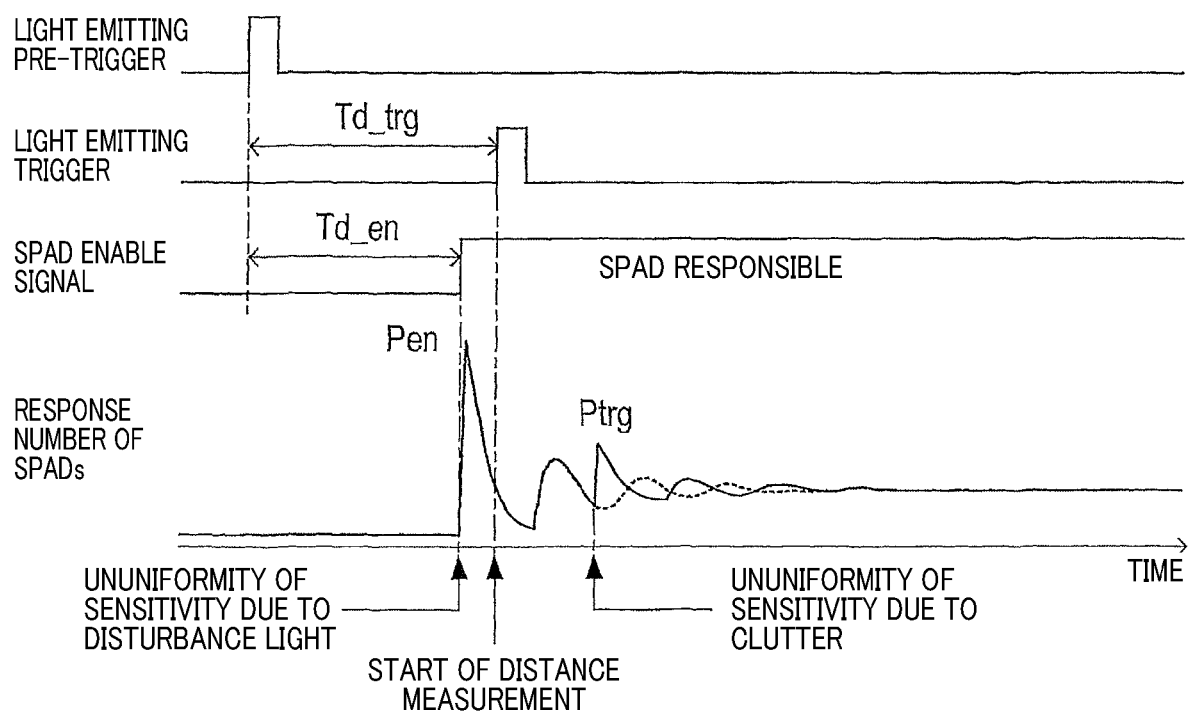

LOW INTENSITY OF DISTURBANCE LIGHT

DISTANCE MEASURING APPARATUS

CROSS REFERENCE TO RELATED DOCUMENTS

The present application claims the benefit of priority of Japanese Patent Application No. 2018-110325 filed on Jun. 8, 2018, the disclosure of which is incorporated herein by reference.

TECHNICAL FIELD

This disclosure generally relates to a distance measuring apparatus designed to measure a time it takes for a distance-measuring light beam to travel to an object, reflect at the object, and then return to the distance measuring apparatus, to determine a distance to the object.

BACKGROUND ART

The above type of distance measuring apparatuses are usually equipped with a photodetector to sense light reflected from an object. As such a photodetector, avalanche photodiodes (which will also be referred to below as APDs) are usually used, as taught in Patent literature 1, in a Geiger mode to detect light.

The avalanche photodiodes operating in the Geiger mode are referred to as SPADs which are actuated by application of voltage thereto which is higher in level than a breakdown voltage in the form of a reverse bias voltage. SPAD is an abbreviation of "Single Photon Avalanche Diode".

SPADs break down in response to input of a photon. Photodetectors equipped with the SPAD are, therefore, equipped with a quench resistor to recharge the SPAD after responding to the input of a photon.

The quench resistor is made of a resistor or a semiconductor device, such as a MOSFET. The quench resistor works to output a detection signal produced by a flow of electrical current resulting from breakdown of the SPAD and stops the SPAD from responding upon a voltage drop arising from that flow of electrical current, thereby electrically recharging the SPAD.

When the SPAD is recharged in the above way and, thus, becomes operable to achieve photo detection, it may produce a false response in the absence of input of a photon due to, for example, carriers trapped in crystal detects. This, therefore, requires the need for a given dead time after the SPAD produces a response.

However, in a case where the above type of a photodetector is used in distance measuring apparatuses, the dead time may be a factor resulting in reduction in responsiveness of a distance measuring operation which may adversely affect in-vehicle systems.

Accordingly, distance measuring apparatuses have been proposed which are, as taught in patent literature 2, equipped with a plurality of photodetectors made of SPADs and work to count the number of the photodetectors which have detected light at a given time interval in a distance-measuring mode and determine that reflected light has been inputted thereto when the counted number is higher than or equal to a given threshold value.

PRIOR ART LITERATURE

Patent Literature

PATENT LITERATURE 1 Japanese patent first publication No. 2017-75906

PATENT LITERATURE 2 Japanese patent No. 564494

SUMMARY OF THE INVENTION

When the plurality of photodetectors of the above distance measuring apparatus are designed to react to light at random, the number of the photodetectors capable of reacting simultaneously within a given time frame is small. The detection of input of light reflected from an object is, therefore, achieved successfully based on determination of whether the number of the photodetectors which have simultaneously reacted to light is higher than a threshold value.

However, when the plurality of photodetectors become reactive simultaneously in response to enable signals during input of light, it will cause the photodetectors to simultaneously respond to the light. Alternatively, when light emitted to achieve distance measurement is inputted as clutter to the photodetectors, it may cause the plurality of photodetectors to simultaneously react to the clutter.

The photodetectors are, as described above, placed in an inactive mode in the dead time. When the plurality of photodetectors simultaneously become reactive after expiry of the dead time, it will, therefore, result in an increase in number of the photodetectors responsive to light.

The number of the photodetectors responding to light, therefore, changes in a cycle required to recharge the photodetectors. There are, therefore, photodetectors which are capable of reacting and photodetectors which are not capable of reacting during such change, thereby resulting in a decreased number of the photodetector subsequently simultaneously responsive to light. The change eventually converges.

Consequently, even though the number of the photodetectors simultaneously responding to light is changed due to disturbance light or clutter upon start-up of the photodetectors, so that total sensitivity of the photodetectors to light varies, it will ultimately converge below the threshold value, so that the sensitivity becomes stable.

When the number of the photodetectors simultaneously reactive decreases below the threshold value, it will result in an increase in number of the photodetectors responding to input of light reflected from an object is inputted. The distance to the object may be, therefore, derived by measuring the time it takes for emitted light to reflect off the object and then return to the distance measuring apparatus.

Detailed reviews made by the inventors of this application, however, show that in a condition where variations in sensitivity due to both clutter and disturbance light, a drawback is encountered in that a length of time between emission of distance-measuring light and when the sensitivity becomes stable will be undesirably increased, which may result in a failure in measuring a distance to an object existing in the vicinity of the distance measuring apparatus.

According to one aspect of this disclosure, there is provided a distance measuring apparatus equipped with a plurality of photodetectors made of SPADs. The distance measuring apparatus is preferably designed to minimize a risk that a period of time for which the sensitivity of the photodetectors to light is non-uniformly varied may be increased by clutter after start of distance measurement.

According to one aspect of this disclosure, there is provided a distance measuring apparatus which comprises an illuminator which emits distance-measuring light, a plurality of photodetectors, a time measuring unit, a timing controller, and a timing instruction unit.

The photodetectors include SPADs implemented by avalanche photodiodes which are operable in a Geiger mode and work to detect a reflected light arising from reflection of the distance-measuring light, as emitted by the illuminator, on an object.

The time measuring unit is configured to measure time elapsed after the emission of the distance-measuring light from the illuminator until a number of the photodetectors which is larger than a given value have detected light.

The timing controller is responsive to input of an externally-supplied distance-measuring command to activate the illuminator to emit the distance-measuring light and also activate the SPADs constituting the photodetectors in the Geiger mode to execute distance measurement made by the time measuring unit.

The timing controller is, therefore, capable of instructing the time measuring unit to measure the time elapsed after the emission of the distance-measuring light from the illuminator until a number of the photodetectors which is larger than the given value have detected the reflected light arising from reflection of the distance-measuring light, as emitted by the illuminator, from the object to measure a distance to the object.

When the timing controller instructs the illuminator to emit light, it may cause a portion of the light to be reflected inside the distance measuring apparatus as clutter before the light is outputted outside the distance measuring apparatus, so that the clutter is inputted to the photodetectors to cause the photodetectors to simultaneously respond the clutter.

When the timing controller instructs the SPADs of the photodetectors to operate in the Geiger mode, and the intensity of ambient disturbance light is high at start of the operation of the SPADs, it may cause the photodetectors to simultaneously respond the disturbance light.

Accordingly, when the timing controller instructs the illuminator to emit the distance-measuring light to start a distance-measuring operation of the time measuring unit, it may cause the photodetectors to simultaneously respond the clutter or the disturbance light, thereby resulting in non-uniform variation in sensitivity of the photodetectors to light.

Particularly, simultaneous occurrence of the non-uniform variations in sensitivity of the photodetector arising from the clutter and the disturbance light may result in an increase in time required for the light sensitivity of the photodetectors to become stable, which leads to a failure in achieving the distance measurement in a short range.

In order to alleviate the above problem, the timing instruction unit is designed to determine a light emission timing at which the timing controller instructs the illuminator to emit the distance-measuring light in response to the distance-measuring command and an activation start timing at which the timing controller activates the SPADs to operate in the Geiger mode in response to the distance-measuring command.

The distance measuring apparatus in this disclosure is, therefore, capable of altering the light emission timing for the illuminator and the activation start timing for the photodetectors using the timing instruction unit. This decreases a period of time for which the non-uniform variation in light sensitivity of the photodetectors occurs after the emission of the distance-measuring light from the illuminator, thereby ensuring the accuracy of distance measurement at the short range.

BRIEF DESCRIPTION OF THE DRAWINGS

FIG. 3 is a time chart which demonstrates an example of how to determine output timings of a light-emitting trigger and a SPAD enable signal when the intensity of disturbance light is high.

EMBODIMENTS FOR CARRYING OUT THE INVENTION

Embodiments of the invention will be described below with reference to the drawings.

First Embodiment

Figure 1:
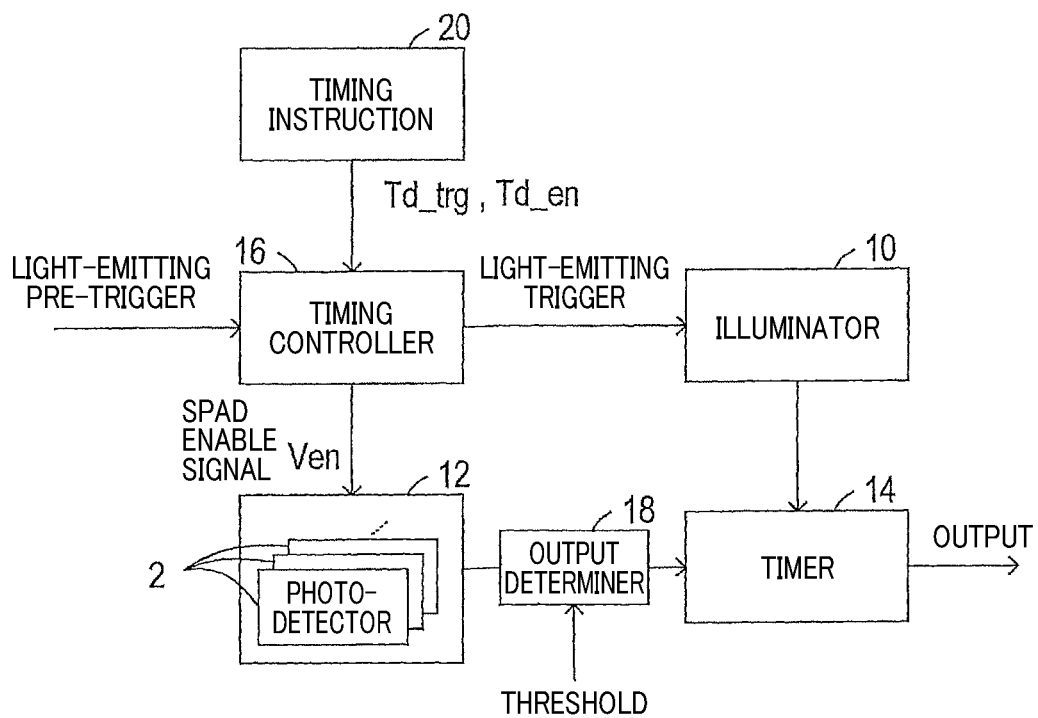
FIG. 1 is a block diagram which illustrates an overall structure of a distance measuring apparatus in the first embodiment.

A distance measuring apparatus in this embodiment is mounted in, for example, a vehicle to measure a distance to an obstacle existing around the vehicle and, as illustrated in FIG. 1, equipped with the illuminator 10, the detector 12 equipped with a plurality of photodetectors 2, the time measuring unit 14, and the timing controller 16.

The illuminator 10 is configured to emit distance-measuring light outside the vehicle and made of an electrical circuit equipped with a light emitting device implemented by, for example, a light emitting diode working to emit a laser. The illuminator 10 activates the light emitting diode in response to a light-emitting trigger inputted from the timing controller 16 to emit distance-measuring light in the form of a laser beam in a given direction.

The detector 12 works to detect light resulting from reflection of light, as emitted from illuminator 10, on an object and is made of a matrix of the photodetectors 2 arranged in vertical and lateral directions in the shape of a light-receiving array.

Figure 2A:
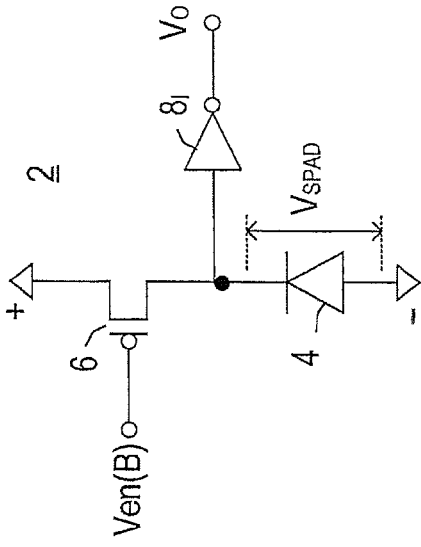
FIG. 2A is a circuit diagram which illustrates an example of a structure of a photodetector.
Figure 2B:
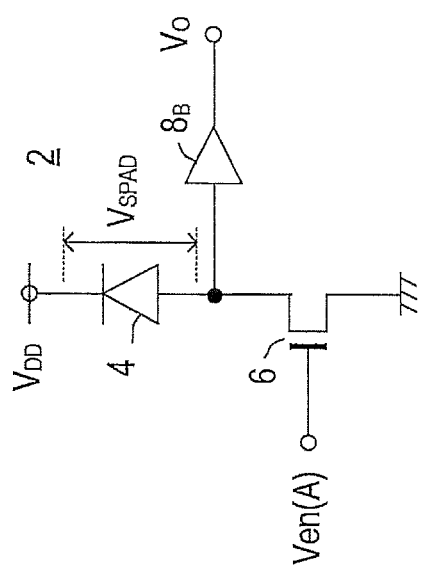
FIG. 2B is a circuit diagram which illustrates another example of a structure of a photodetector.

Each of the photodetectors 2 is, as illustrated in FIGS. 2A and 2B, equipped with the SPAD 4, the quench resistor 6, and the pulse output unit 8.

The SPAD 4 is implemented by an APD operable in the Geiger mode. The quench resistor 6 is connected in series with an energizing path leading to the SPAD 4.

The quench resistor 6 serves to develop a voltage drop in response to electrical current flowing through the SPAD 4 upon breakdown of the SPAD 4 due to input of photons to the SPAD 4, thereby stopping the SPAD 4 from creating a Geiger discharge. In this embodiment, the quench resistor 6 is implemented by a MOSFET.

Accordingly, in this embodiment, a given gate voltage is applied to the MOSFET constituting the quench resistor 6 to turn on the MOSFET to develop an on-resistance which causes a reverse bias voltage $V_{SPAD}$ to be applied to the SPAD 4.

The application of the gate voltage is stopped to turn off the MOSFET, thereby disconnecting the energizing path leading to the SPAD 4 to deactivate the SPAD 4.

The gate of the MOSFET also undergoes application of the enable signal Ven inputted by the timing controller 16 to the detector 12. When the enable signal Ven is changed to a high level, it will cause the MOSFET to be turned on to place the SPAD 4 in a mode responsive to input of photons.

A junction of the quench resistor 6 and the SPAD 4 is connected to the pulse output unit 8. The pulse output unit 8 is designed to measure an electrical potential developed at the junction to detect occurrence of breakdown of the SPAD 4 due to input of photons. Upon change in electrical potential at the junction due to the breakdown of the SPAD 4, the pulse output unit 8 outputs a digital pulse having a constant pulse width in the form of a detection signal $V_o$.

In each of the photodetectors 2, the SPAD 4, as clearly illustrated in FIG. 2A, may be designed to have a cathode connected to a positive power line and an anode connected to a ground line through the quench resistor 6 implemented by an re-channel MOSFET.

The SPAD 4 may alternatively be, as illustrated in FIG. 2B, designed to have a cathode connected to the quench resistor 6 made of a p-channel MOSFET. A direct current may be applied to the shown series circuit to have an end of the series circuit which is located close to the quench resistor 6 and at which a positive electrical potential is developed and an opposite end thereof which is located close to the SPAD 4 and at which a negative electrical potential is developed.

In the photodetector 2 shown in either of FIG. 2A or FIG. 2B, the enable signal Ven(A) or Ven(B) may be inputted to the MOSFET constituting the quench resistor 6, thereby applying the reverse bias voltage $V_{SPAD}$ to the SPAD 4 to bring the photodetector 2 into the responsive mode.

The time measuring unit 14 works to measure time elapsed after the illuminator 10 emits distance-measuring light until a return of the distance-measuring light is detected by the detector 12 and output the measured time in the form of information about a distance between a vehicle equipped with this system and an object existing around the vehicle to an in-vehicle device serving as a driving assistance system for the vehicle. The time measuring unit 14 is made of an electrical circuit equipped with, for example, a timer circuit operating in the above way.

The time measuring unit 14 determines that reflected light traveling from the object has been inputted to the detector 12 when a number of the photodetectors 2 which is larger than a given value have detected returns of the distance-measuring light.

To the above end, the output determiner 18 is disposed between the detector 12 and the time measuring unit 14. The output determiner 18 works to sum up the number of detection signals $V_O$ which have been substantially simultaneously outputted from the photodetectors 2 of the detector 12 and determine whether such sum total is larger than or equal to a preselected threshold value. The output determiner 18 is made of an electrical circuit equipped with an adder and a comparator.

The time measuring unit 14 determines that reflected light traveling from an object around the vehicle has been inputted to the detector 12 using outputs from the output determiner 18 and then output time elapsed after emission of distance-measuring light from the illuminator 10 as information about a distance to the object.

The timing controller 16 is made of a control circuit which is responsive to input of a light-emitting pre-trigger that is a distance-measuring command from outside to activate the illuminator 10 to emit light and also output the enable signal Ven to the detector 12 to start distance measurement made by the time measuring unit 14.

The timing controller 16 is, as demonstrated in FIGS. 3 to 7, responsive to input of the light-emitting pre-trigger to output the light-emitting trigger to activate the illuminator 10 to emit light after the elapse of a predetermined light-emitting standby time Td_trg following the input of the light-emitting pre-trigger.

When a predetermined detection standby time Td_en has passed following the input of the light-emitting pre-trigger, the timing controller 16 also outputs the enable signal Ven to the detector 12 to start light-detecting operations of the photodetectors 2.

When a light emission timing in the illuminator 10 or an activation start timing of the photodetectors 2 is constant or fixed, it may result in an increase in time it takes to be able to measure a distance to an object after emission of light from the illuminator 10 depending upon the state of installation of the distance measuring apparatus in the vehicle or surroundings of the vehicle.

For the above reasons, the distance measuring apparatus in this embodiment is designed to be capable of altering the standby time Td_trg and the standby time Td_en between input of the light-emitting pre-trigger to the timing controller 16 and output of the light-emitting trigger from the timing controller 16 and between input of the light-emitting pre-trigger to the timing controller 16 and output of the enable signal Ven from the timing controller 16.

The distance measuring apparatus in this embodiment is also equipped with the timing instructing unit 20 which determines the standby times Td_trg and Td_en and instructs the timing controller 16 to be placed in the standby mode for the standby times Td_trg and Td_en manually or using setting equipment.

When the intensity of disturbance light inputted to the detector 12 is strong, the timing instructing unit 20 is, as demonstrated in FIG. 3, capable of setting the standby times Td_trg and Td_en so that the timing controller 16 outputs the light-emitting trigger to the illuminator 10 after the enable signal Ven is outputted to the detector 12 following input of the light-emitting pre-trigger thereto.

Figure 4:
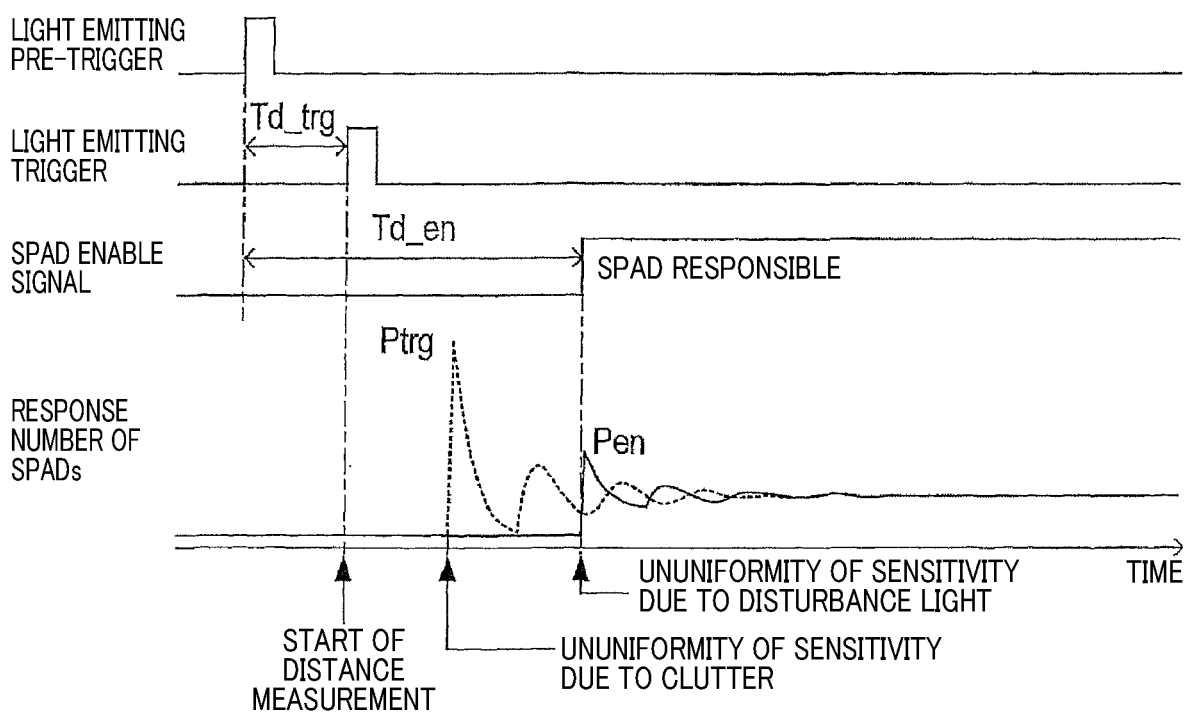
FIG. 4 is a time chart which demonstrates an example of how to determine output timings of a light-emitting trigger and a SPAD enable signal when the intensity of disturbance light is low.

Alternatively, when the intensity of disturbance light inputted to the detector 12 is weak, the timing instructing unit 20 is, as demonstrated in FIG. 4, capable of setting the standby times Td_trg and Td_en so that the timing controller 16 outputs the enable signal Ven to the detector 12 after the light-emitting trigger is outputted to the illuminator 10 following input of the light-emitting pre-trigger thereto.

Specifically, when the intensity of the disturbance light is high, output of the enable signal Ven to the detector 12 to simultaneously turn on the photodetectors 2 will cause the SPADs 4 of the photodetectors 2, as demonstrated in FIG. 3, to be activated substantially simultaneously, thereby resulting in a large increase in number Pen of the detection signals $V_O$ outputted from the detector 12.

When the photodetectors 2 are required to be simultaneously activated in the above way, it will result in an increase in number of the photodetectors 2 which are placed in a responsive mode simultaneously after the SPADs 4 are recharged because the SPADs 4 are recharged through the quench resistor 6.

The number of the SPADs 4 which simultaneously become responsive, therefore, undergoes a change in a cycle which corresponds to a time length required for the SPADs 4 to be recharged, thereby resulting in a variation in sensitivity of the detector 12 to light.

In the above case, the number of the SPADs 4 which become simultaneously responsive is gradually decreased, but however, the accuracy in detecting light reflected from an object will be low until the above decrease converges, so that the sensitivity of the detector 12 to light becomes stable.

Accordingly, when the intensity of disturbance light is high, the light-emitting standby time Td_trg is increased to be longer than the detection standby time Td_en to activate the illuminator 10 to emit light after the number of the SPADs which are responsive to the disturbance light is decreased after start-up of the operation of the detector 12.

When the illuminator 10 is activated to emit light, it may be received as clutter by the detector 12, thereby resulting in an increase in number Ptrg of the photodetectors 2 which are responsive, which leads to a non-uniform variation in sensitivity of the detector 12.

In order to alleviate the above problem, this embodiment, as illustrated in FIG. 3, determines the light-emitting standby time Td_trg to overlap a period of time for which the sensitivity of the detector 12 is undesirably varied due to the clutter with a period of time for which the sensitivity of the detector 12 is undesirably varied due to disturbance light.

The above time overlap causes the number of the photodetectors 2 which are responsive to the clutter to be cancelled by the number of the photodetectors 2 which are responsive to the disturbance light, thereby shortening a period of time required until the sensitivity of the detector 12 becomes stable to achieve accurate distance measurement after the illuminator 10 is activated to emit light.

Figure 5:
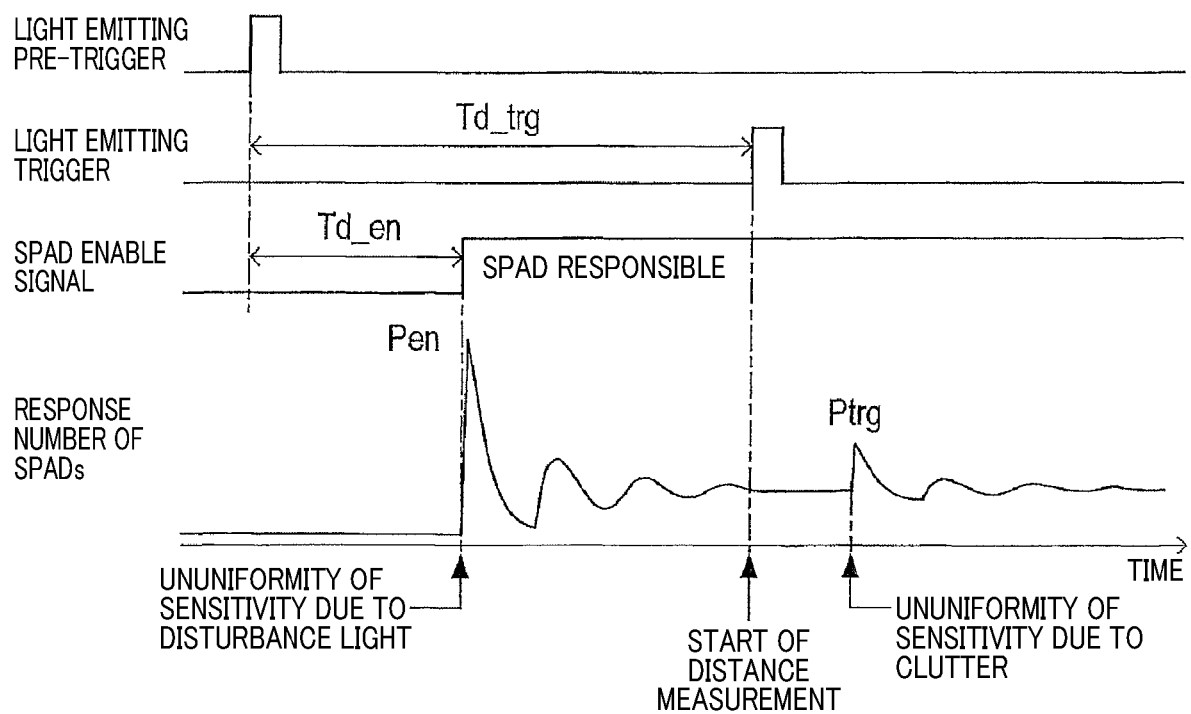
FIG. 5 is a time chart which represents a modification of how to determine an output timing when the intensity of disturbance light is high.

When the intensity of the disturbance light is high, the timing instructing unit 20, as demonstrated in FIG. 5, may determine the standby time Td_trg so that the timing controller 16 outputs the light-emitting trigger to the illuminator 10 after the variation in sensitivity of the detector 12 due to the disturbance light becomes stable following output of the enable signal Ven to the detector 12.

Alternatively, when the intensity of the disturbance light is low, and the enable signal Ven is outputted to activate the photodetectors 2, it will cause, as clearly illustrated in FIG. 4, the number Pen of the photodetectors 2 which are responsive to the disturbance light to be smaller than that when the intensity of the disturbance light is high.

Accordingly, when the intensity of the disturbance light is low, the light-emitting trigger is outputted to the illuminator 10 to emit light before the enable signal Ven is outputted to the detector 12.

Generation of clutter arising from emission of light from the illuminator 10 will result in a non-uniform variation in sensitivity of the detector 12. The enable signal Ven is outputted to the detector 12 to activate the photodetectors 2 in a period of time for which the sensitivity of the detector is non-uniformly varied, thereby overlapping such a period of time with a period of time for which the sensitivity varies non-uniformly due to the disturbance light.

The above time overlap will result in a decreased period of time in which the sensitivity of the detector 12 is non-uniformly varied due to the disturbance light after start-up of the operation of the detector 12.

Figure 6:
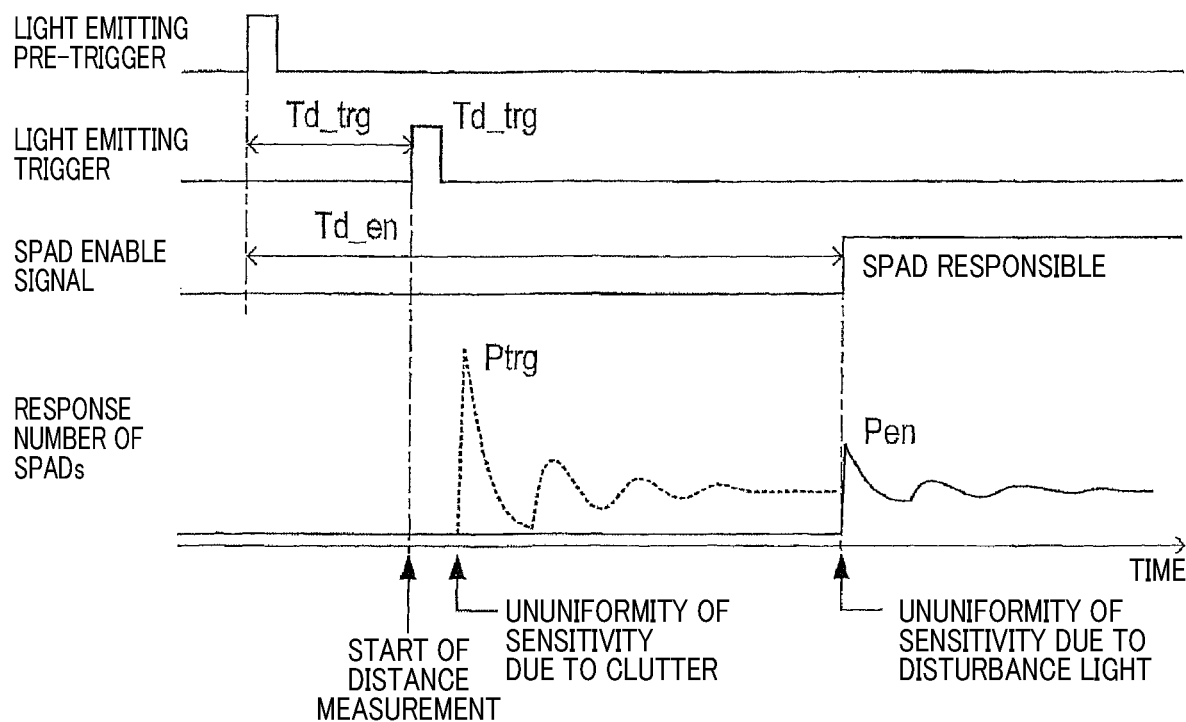
FIG. 6 is a time chart which represents a modification of how to determine an output timing when the intensity of disturbance light is low.
Figure 7:
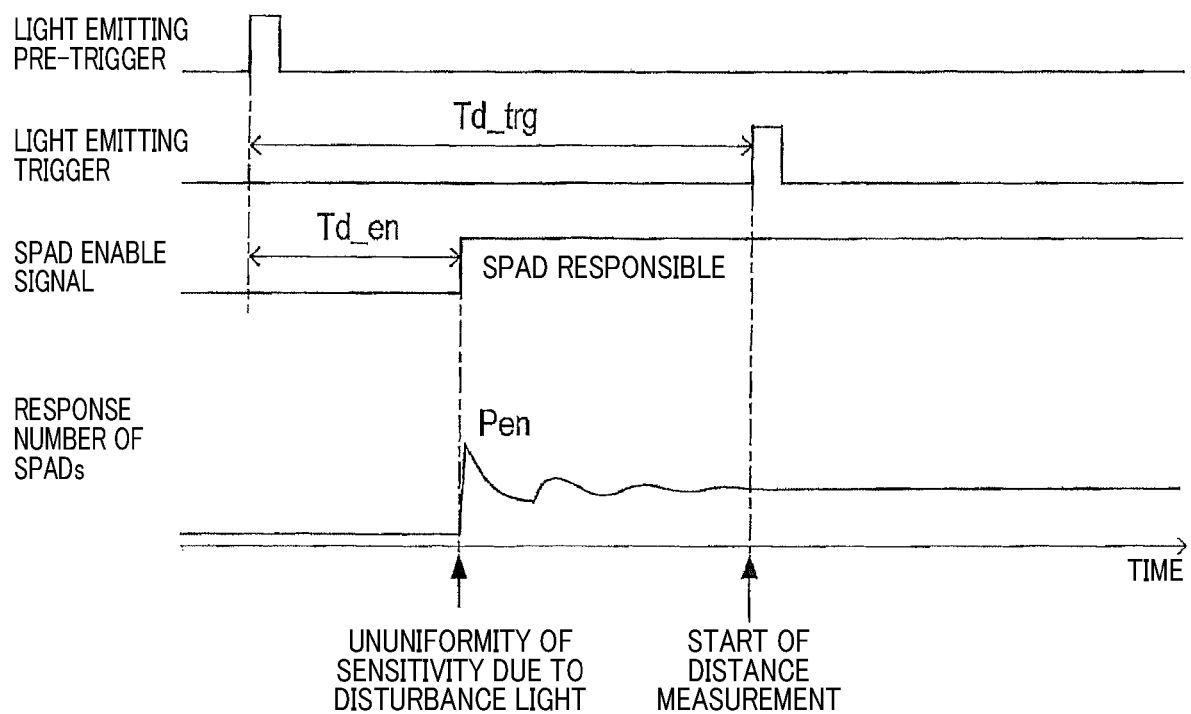
FIG. 7 is a time chart which demonstrates an example of how to determine output timings of a light-emitting trigger and a SPAD enable signal in the absence of clutter.

When the intensity of the disturbance light is low, the enable signal Ven may be, as demonstrated in FIG. 6, outputted to the detector 12 after the light-emitting trigger is outputted to the illuminator 10 to emit light, and the non-uniform variation in sensitivity of the detector 12 converges.

The clutter may not occur depending upon the state of installation of the distance measuring apparatus in the vehicle. In such a case, the detection standby time Td_en and the light-emitting standby time Td_trg may be, as demonstrated in FIG. 7, determined so that the light-emitting trigger is outputted to the illuminator 10 after the enable signal Ven is outputted to the detector 12, and the variation in sensitivity of the detector 12 arising from the disturbance of light becomes stable.

As apparent from the above discussion, the distance measuring apparatus in this embodiment is designed to be capable of altering the light-emitting standby time Td_trg between input of the light-emitting pre-trigger to the timing controller 16 and output of the light-emitting trigger to the illuminator 10 and the detection standby time Td_en between the input of the light-emitting pre-trigger to the timing controller 16 and output of the enable signal Ven to the detector 12.

The distance measuring apparatus is, therefore, capable of determining the light emission timing of the illuminator 10 and the start timing of activation of the detector 12, as demonstrated in FIGS. 3 to 7, depending upon the intensity of the disturbance light or the presence of clutter.

The distance measuring apparatus in this embodiment is, therefore, capable of decreasing a time interval between emission of light from the illuminator 10 and when the sensitivity of the detector 12 becomes stable to achieve accurate distance measurement. This enables the distance measuring apparatus to have an increased distance measurable range.

Second Embodiment

The first embodiment has been explained as being equipped with the timing controller 16 working to determine the light-emitting standby time Td_trg that is a time interval between input of the light-emitting pre-trigger to the timing controller 16 and output of the light-emitting trigger to the illuminator 10 and the detection standby time Td_en that is a time interval between the input of the light-emitting pre-trigger to the timing controller 16 and output of the enable signal Ven to the detector 12 using the timing instructing unit 20.

Figure 8:
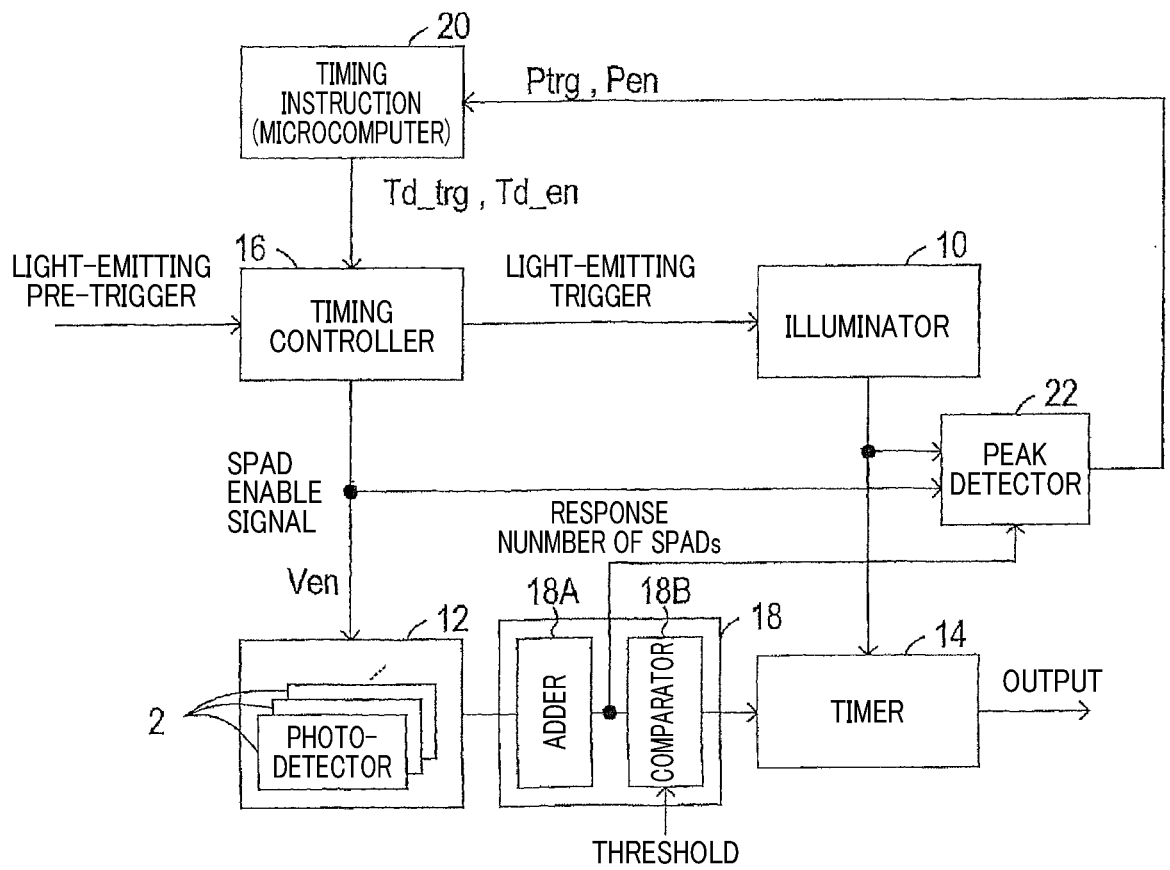
FIG. 8 is a block diagram which illustrates an overall structure of a distance measuring apparatus in the second embodiment.

In contrast to the above, the distance measuring apparatus in this embodiment is, as illustrated in FIG. 8, designed to have the timing instructing unit 20 made of an arithmetic processing circuit, such as a microcomputer, which automatically determines the light-emitting standby time Td_trg and the detection standby time Td_en.

Specifically, in this embodiment, the output determiner 18 includes the adder 18A and the comparator 18B. The adder 18A counts the total number of the detection signals $V_O$ which have been substantially simultaneously outputted from the photodetectors 2 of the detector 12. The comparator 18B determines whether the total number is larger than or equal to a given threshold value.

When it is determined in the comparator 18B that the total number is larger than or equal to the threshold value, the detection signals are outputted to the time measuring unit 14. The total number counted by the adder 18A is also outputted, as representing the number of the SPADs 4 which have substantially simultaneously become responsive, to the peak detector 22 in addition to the comparator 18B.

The peak detector 22 works to detect a maximum value of the total number Ptrg of the SPADs 4 which have substantially simultaneously responded to clutter after emission of distance-measuring light from the illuminator 10 and also detect a maximum value of the total number Pen of the SPADs 4 which have substantially simultaneously responded to disturbance light after activation of the detector 12 in response to the enable signal Ven.

The total number Prg of the SPADs 4 having been responded to the clutter and the total number Pen of the SPADs 4 having been responded to the disturbance light, as determined by the peak detector 22, are inputted to the timing instructing unit 20. The timing instructing unit 20 then determines the standby times Td_trg and Td_en as a function of the total numbers Prg and Pen.

A timing determining operation executed by the timing instructing unit 20 to set the standby times Td_trg and Td_en in the above way will be described below using FIGS. 9 and 10.

Figure 9:
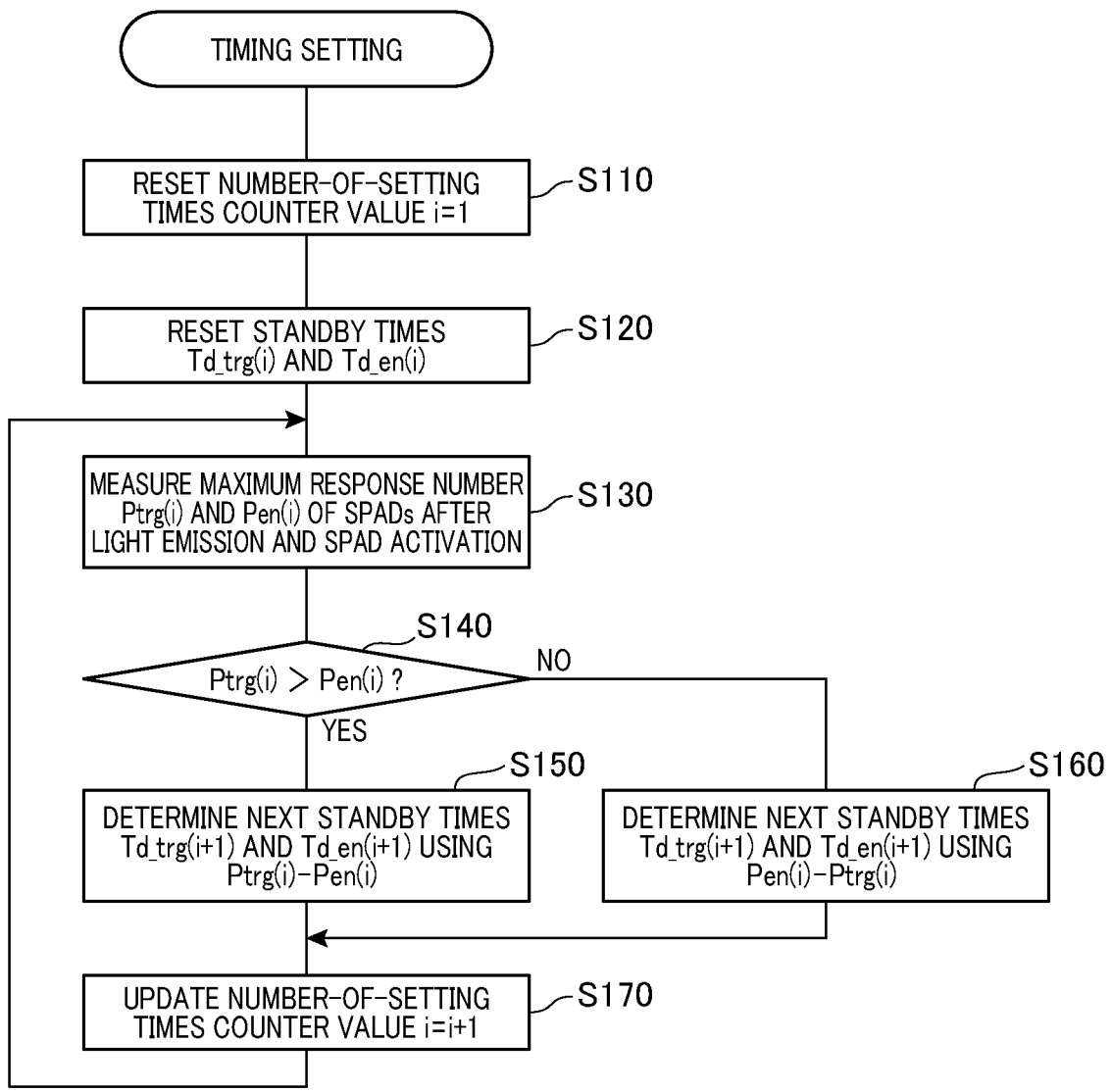
FIG. 9 is a flowchart which demonstrates a timing determining operation executed in a timing instruction unit in the second embodiment.

After starting the timing determining operation, the routine, as illustrated in FIG. 9, proceeds to step S110 wherein a number-of-setting times counter value i is reset to an initial-value one. The routine proceeds to step S120 wherein the standby times Td_trg(i) and Td_dn(i) are each reset to an initial value.

The routine proceeds to step S130 wherein the standby times Td_trg and Td_en for which the timing controller 16 is placed in a standby mode until it outputs the light-emitting trigger and the enable signal Ven after input of the light-emitting pre-trigger to the timing controller 16 are set to the current values of the standby times Td_trg(i) and Td_en(i).

The routine proceeds to step S130 wherein a response number Ptrg(i) that is the maximum number of the SPADs 4 which have substantially simultaneously responded to clutter and a response time Pen(i) that is the maximum number of the SPADs 4 which have substantially simultaneously responded to disturbance light are counted using the peak detector 22 after the standby times Td_trg and Td_en are set.

Subsequently, the routine proceeds to step S140 wherein the response numbers Ptrg(i) and Pen(i), as derived in step S130, are compared with each other to determine which is the larger of the response numbers Ptrg(i) and Pen(i). If the response number Ptrg(i) arising from the clutter is determined to be larger than the response number Pen(i) arising from the disturbance light, then the routine proceeds to step S150. Alternatively, if not, then the routine proceeds to step S160.

In step S150, since the response number Ptrg(i) arising from the clutter is larger than the response number Pen(i) arising from the disturbance light, and, thus, the disturbance light is lower in intensity than the clutter, the standby time Td_trg(i+1) and the standby time Td_en(i+1) used in a subsequent cycle are determined to have the light-emitting standby time Td_trg to be shorter than the detection standby time Td_en.

Figure 10:
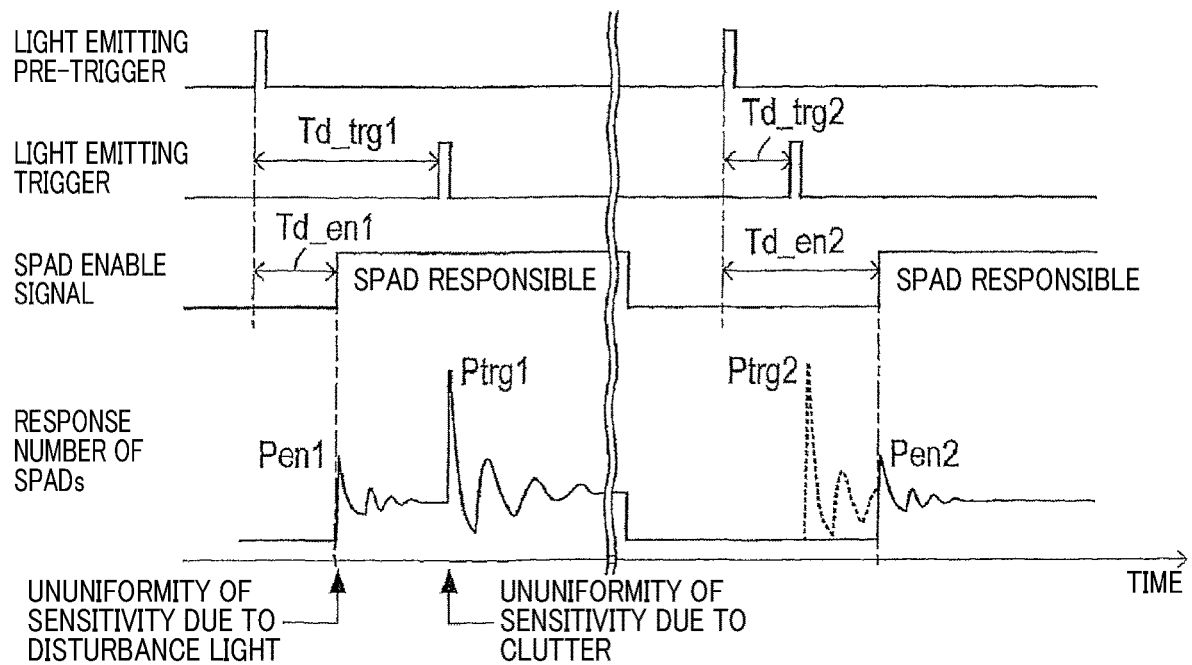
FIG. 10 is a time chart which demonstrates a sequence of steps to determine output timings of a light-emitting trigger and a SPAD enable signal in the timing determining operation shown in FIG. 9.

Specifically, when the response number Ptrg1 arising from the clutter is, as exemplified in FIG. 10, larger than the response number Pen1 resulting from the disturbance light, the light-emitting standby time Td_trg2 and the detection standby time Td_en2 for use in the subsequent cycle are determined so that the light-emitting standby time Td_trg2 is shorter than the detection standby time Td_en2.

In step S150, the standby times Td_trg(i+1) and Td_en(i+1) for use in the subsequent cycle are determined as a function of a difference between the response number Ptrg(i) and the response number Pen(i) (i.e., Ptrg(i)−Pen(i)) so that a time difference between the light-emitting standby time Td_trg and the detection standby time Td_en is increased with an increase in the difference between the response number Ptrg(i) and the response number Pen(i).

Alternatively, in step S160, since the response number Pen(i) arising from the disturbance light is larger than the response number Ptrg(i) arising from the clutter, meaning that the disturbance light is higher in intensity than the clutter, the standby time Td_trg(i+1) and the standby time Td_en(i+1) used in the subsequent cycle are determined to have the detection standby time Td_en to be shorter than the light-emitting standby time Td_trg.

Additionally, in step S160, the standby times Td_trg(i+1) and Td_en(i+1) for use in the subsequent cycle are determined as a function of a difference between the response number Ptrg(i) and the response number Pen(i) (i.e., Pen(i)−Ptrg(i)) to have a time difference between the light-emitting standby time Td_trg and the detection standby time Td_en as being increased with an increase in the difference between the response number Ptrg(i) and the response number Pen(i).

After the light-emitting standby time Td_trg(i+1) and the detection standby time Td_en(i+1) for use in the subsequent cycle are determined in step S150 or S160, the routine proceeds to step S170 wherein the number-of-setting times counter value i is updated or incremented by one. The routine then proceeds to step S130.

As apparent from the above discussion, the timing instructing unit 20 in this embodiment works to determine the standby times Td_trg and Td_en for use in a subsequent cycle based on the response number Ptrg of the SPADs 4 which has arisen from the clutter and is derived using the peak detector 22 in the distance measuring operation and the response number Pen of the SPADs 4 which has arisen from the disturbance light and is derived using the peak detector 22 in the distance measuring operation.

Consequently, the light emission timing of the illuminator 10 and the start timing of activation of the detector 12 are, as demonstrated in FIGS. 3 to 7, determined automatically depending upon the intensity of the disturbance light or the presence of clutter.

It is, therefore, possible to determine the light emission timing of the illuminator 10 and the start timing of activation of the detector 12 suitably in response to a change in surrounding environment when the vehicle is traveling during the day or night, thereby improving the usability of the distance measuring apparatus in this disclosure.

The time required for a non-uniform variation in sensitivity of the detector 12 resulting from clutter or disturbance light to converge may be determined using the response number Ptrg of the SPADs 4 and the response number Pen of the SPADs 4 derived in step S130.

Therefore, when it is required to output the light-emitting trigger or the enable signal after the non-uniform variation in sensitivity due to the disturbance light or the clutter converges, the time required for such convergence to be completed may be calculated in step S150 or S160 using the response number Ptrg or Pen derived in step S130. This ensures easy and proper determination of the standby times Td_trg and Td_en.

Third Embodiment

The second embodiment is equipped with the peak detector 22 in order to automatically determine the light emission timing of the illuminator 10 and the activation start timing of the detector 12 depending upon surrounding environments of the vehicle.

The peak detector 22, as described above, detects maximum values of the response numbers Ptrg and Pen of the SPADs which have substantially simultaneously responded to the clutter and the disturbance light. The timing instructing unit 20 determines the standby times Td_trg and Td_en using the maximum values detected by the peak detector 22.

Figure 11:
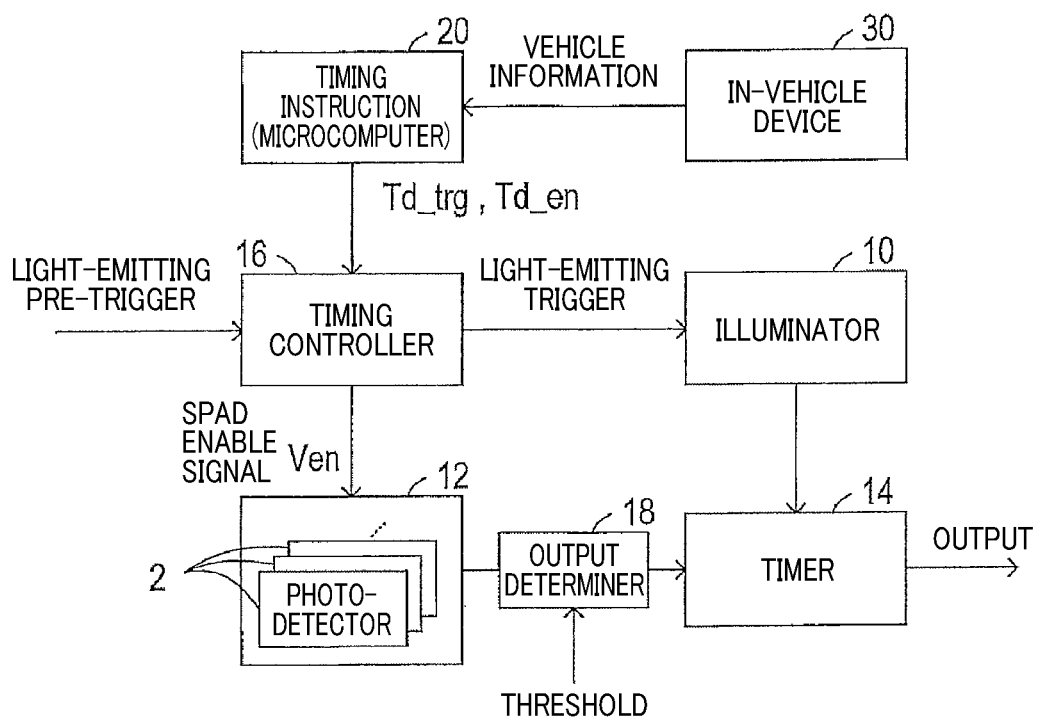
FIG. 11 is a block diagram which illustrates an overall structure of a distance measuring apparatus in the third embodiment.

In contrast to the above, this embodiment is, as clearly illustrated in FIG. 11, designed to have the timing instructing unit 20 to which vehicle information about an actual positon of the vehicle, a current time, and/or weather conditions is inputted from the in-vehicle device 30.

The timing instructing unit 20 is, like in the second embodiment, made of an arithmetic processing circuit, such as a microcomputer, and determines the light-emitting standby time Td_trg and the detection standby time Td_en for the timing controller 16 using the vehicle information outputted from the in-vehicle device 30.

Figure 12:
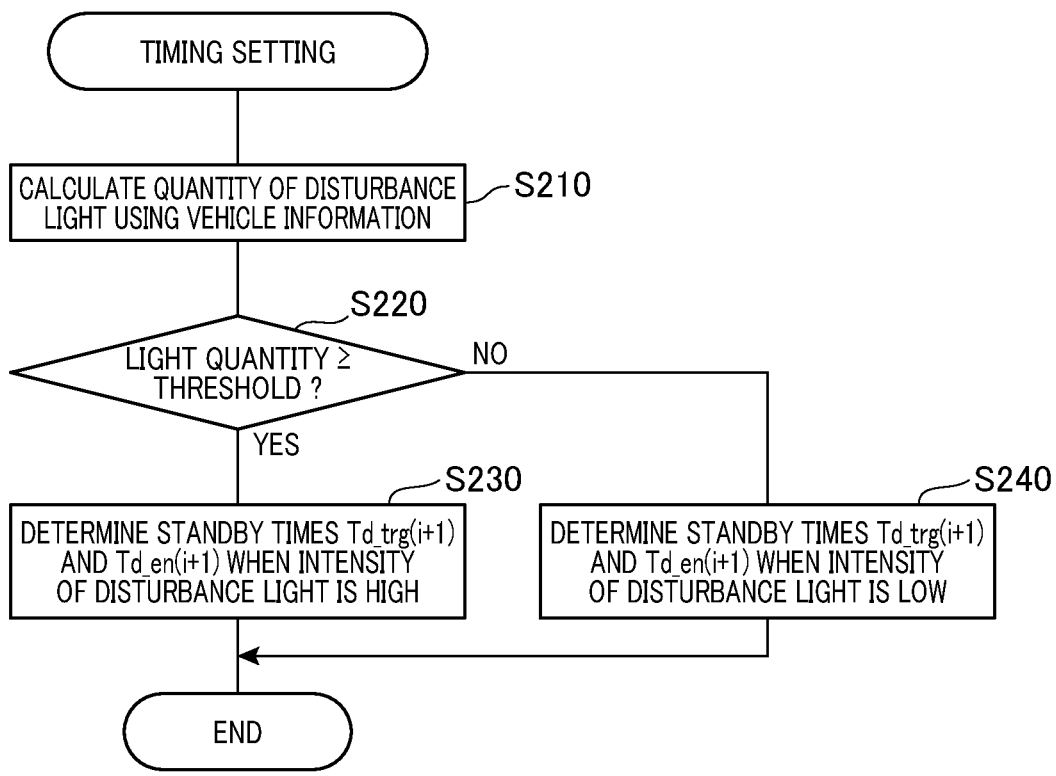
FIG. 12 is a flowchart which represents a timing determining operation executed in a timing instruction unit in the third embodiment.

Specifically, the timing instructing unit 20 executes a timing control program shown in FIG. 12 at a given time interval.

After entering the timing control program, the routine proceeds to step S210 wherein the quantity of disturbance light inputted to the detector 12 is calculated using the vehicle information inputted from the in-vehicle device 30.

The routine proceeds to step S220 wherein it is determined whether the quantity of the disturbance light, as derived in step S210, is larger than or equal to a given threshold value, that is, whether the intensity of the disturbance light is high or low. If a YES answer is obtained meaning that the intensity of the disturbance light is high, then the routine proceeds to step S230. Alternatively, if a NO answer is obtained meaning that the intensity of the disturbance light is low, then the routine proceeds to step S240.

In step S230, the standby times Td_trg and Td_en are determined, as discussed in FIG. 3 or FIG. 5, so that the timing controller 16 outputs the light-emitting trigger to the illuminator 10 after the enable signal Ven is outputted to the detector 12. The routine then terminates.

In step S240, the standby times Td_trg and Td_en are determined, as discussed in FIG. 3 or FIG. 6, so that the timing controller 16 outputs the enable signal Ven to the detector 12 after outputting the light-emitting trigger to the illuminator 10. The routine then terminates.

The distance measuring apparatus in this embodiment is, therefore, capable of automatically determining the light emission timing of the illuminator 10 and the activation start timing of the detector 12 properly as a function of the intensity of disturbance light regardless of a change in surrounding environment during traveling of the vehicle.

While present disclosure has been discussed in terms of embodiments, it should be appreciated that this disclosure is not limited to these embodiments and can be embodied in various ways.

For instance, the third embodiment illustrated in FIGS. 11 and 12 has been described to have the timing instructing unit 20 which works to determine the light-emitting standby time Td_trg and the detection standby time Td_en based on the quantity of disturbance light calculated using the vehicle information derived by the in-vehicle device 30.

In contrast to the above, the distance measuring apparatus in the third embodiment may alternatively be designed to have the timing instructing unit 20 which works to calculate the quantity of light produced by clutter as a function of the number of the SPADs 4 which have responded to light after emission of light from the illuminator 10 and determine the standby times Td_trg and Td_en as a function of a difference between the quantity of the disturbance light and the calculated light quantity produced by the clutter.

A plurality of functions of one component of the structure of each of the above embodiments may be realized by a plurality of components. Alternatively, a single function of one component of the structure of each of the embodiments may be achieved by a plurality of components. A plurality of functions of a plurality of components of the structure of each of the embodiments may also be realized by a single component. A single function performed by a plurality of components of the structure of each of the above embodiments may be realized by a single component. A portion of the components of each of the embodiments may be omitted. At least a portion of components of each of the embodiments may be added to or replaced with a component(s) of another embodiment.

What is claimed is:

1. A distance measuring apparatus comprising:
   an illuminator which is configured to emit distance-measuring light;
   a plurality of photodetectors each of which includes a single-photon avalanche diode operable in a Geiger mode and which work to detect reflected light arising from reflection of the distance-measuring light from an object using the single-photon avalanche diodes;
   a time measuring unit which measures time elapsed after emission of the distance-measuring light from the illuminator until a number of the photodetectors which is larger than a given value have detected the reflected light;
   a timing controller which is responsive to input of a distance-measuring command from outside to activate the illuminator to emit the distance-measuring light and also to activate the single-photon avalanche diodes constituting the photodetectors in the Geiger mode to execute distance measurement made by the time measuring unit; and
   a timing instruction unit which determines a light emission timing at which the timing controller instructs the illuminator to emit the distance-measuring light in response to the distance-measuring command and an activation start timing at which the timing controller activates the single-photon avalanche diodes to operate in the Geiger mode in response to the distance-measuring command, wherein
   the timing instruction unit determines the light emission timing and the activation start timing to shorten a period of time for which the number of the photodetectors which have detected the reflected light after emission of the distance-measuring light from the illuminator varies cyclically causing a non-uniform variation in sensitivity of the photodetectors to the reflected light.

2. The distance measuring apparatus as set forth in claim 1, further comprising an adder which counts a total number of the photodetectors which have detected light at a given time interval, and wherein the timing instruction unit uses the total number counted by the adder to obtain a first number of the photodetectors which have detected light arising from clutter after the illuminator emits the distance-measuring light at the light emission timing and a second number of the photodetectors which have detected light arising from disturbance light after the single-photon avalanche diodes are activated at the activation start timing, and the timing instruction unit determines values of the light emission timing and the activation start timing for use in a subsequent cycle using a difference between the first number and the second number.

3. The distance measuring apparatus as set forth in claim 2, wherein in response to the second number of the photodetectors which have detected the light arising from disturbance light after the activation start timing being larger than the first number of the photodetectors which have detected the light arising from clutter after the light emitting time, the timing instruction unit determines the activation start timing and the light emission timing so that the illuminator emits the distance-measuring light after elapse of a given period of time following start of activation of the single-photon avalanche diodes of the photodetectors.

4. The distance measuring apparatus as set forth in claim 2, wherein in response to the first number of the photodetectors which have detected the light arising from clutter after the light emitting time being larger than the second number of the photodetectors which have detected the light arising from disturbance light after the activation start timing, the timing instruction unit determines the light emission timing and the activation start timing so that the single-photon avalanche diodes of the photodetectors are activated after elapse of a given period of time following emission of the distance-measuring light from the illuminator.

5. The distance measuring apparatus as set forth in claim 1, wherein the distance measuring apparatus is installed in a vehicle, and the timing instruction unit calculates a quantity of the disturbance light using information derived from the vehicle and determines the light emission timing and the activation start timing using the calculated quantity.

* * * * *